United States Patent [19]

Kondo

[11] Patent Number: 5,390,340
[45] Date of Patent: Feb. 14, 1995

[54] RADIO PAGING RECEIVER CAPABLE OF ESTABLISHING CLOCK SYNCHRONIZATION EVEN IN THE ABSENCE OF A PREAMBLE SIGNAL

[75] Inventor: Hisashi Kondo, Tokyo, Japan

[73] Assignee: NEC Corporation, Tokyo, Japan

[21] Appl. No.: 67,626

[22] Filed: May 28, 1993

[30] Foreign Application Priority Data

Jun. 9, 1992 [JP] Japan ................. 4-147840

[51] Int. Cl.[6] ............................................. H04B 7/00
[52] U.S. Cl. ................................. 455/38.1; 375/106
[58] Field of Search .............. 455/38.1, 38.2, 38.4, 455/228; 325/106, 118; 340/825, 44; 370/100.1, 105.3, 105.4, 108

[56] References Cited

U.S. PATENT DOCUMENTS 4,573,173  2/1986  Yoshida .......................... 375/118
4,953,185  8/1990  Goode ............................. 375/106

*Primary Examiner*—Edward F. Urban
*Assistant Examiner*—Mary M. Lin
*Attorney, Agent, or Firm*—Sughrue, Mion, Zinn, Macpeak & Seas

[57] ABSTRACT

In a radio paging receiver operable in response to a radio signal which includes a preamble signal, a call number signal, and a display information signal to decode the call number signal and the display information signal in synchronism with a sequence of internal clock pulses produced from a clock synchronization circuit, the internal clock pulses are also produced from the clock synchronization circuit during a time interval except for the preamble signal with reference to electric field intensity and a phase or a frequency difference between the internal clock pulse sequence and a sequence of digital signal derived from the radio signal. Specifically, the internal clock pulse sequence is produced again when the electric field intensity and the phase or the frequency difference become large so as to keep synchronization of the internal clock pulse sequence during reception of the radio signal.

4 Claims, 3 Drawing Sheets

RADIO PAGING RECEIVER CAPABLE OF ESTABLISHING CLOCK SYNCHRONIZATION EVEN IN THE ABSENCE OF A PREAMBLE SIGNAL

BACKGROUND OF THE INVENTION

This invention relates to a radio paging receiver which is capable of informing a possessor of reception of a call number signal assigned to the radio paging receiver. It is to be noted throughout the instant specification that this invention is applicable not only to a radio paging receiver with a display unit but also to a radio paging receiver without any display unit, although description will be restricted to the radio paging receiver with the display unit.

A conventional radio paging receiver of the type described is operable in response to a radio signal modulated by a paging signal or a call number signal and a display information signal or a message signal displayed on a display unit. In general, such a paging signal and a display information signal is preceded by a preamble signal composed of repetitions of a logic "1" level signal and a logic "0" level signal.

In the radio paging receiver, the radio signal is received as a reception signal and demodulated by a receiver unit into a sequence of digital signals which is delivered to a decoder unit. The decoder unit detects whether or not the call number signal included in the digital signals is coincident with a preassigned call number signal. On detection of coincidence between the call number signal and the preassigned call number signal, a loudspeaker and a display unit are energized to generate an audible tone and to display the display information signal.

In order to correctly carry out the above-mentioned processing in the decoder unit, a sequence of internal clock pulses which is synchronized with the digital signal sequence should be reproduced within the radio paging receiver. To this end, a clock synchronization circuit is included in the radio paging receiver. In the clock synchronization circuit, synchronization control operation is carried out only during reception of the preamble signal and is finished after the preamble signal. Therefore, the internal clock synchronization pulses are autonomously generated in the radio paging receiver after the synchronization control operation.

With this structure, it often happens that the internal clock pulses are disordered from the digital signal for some reason and are put into an asynchronous state. In this event, synchronization can be neither controlled nor recovered after reception of the preamble signal in the conventional radio paging receiver. Accordingly, an error is liable to occur in the conventional paging receiver after reception of the preamble signal.

SUMMARY OF THE INVENTION

It is an object of this invention to provide a radio paging receiver which is capable of correctly reproducing or recovering a sequence of internal clock pulses even after reception of a preamble signal.

It is another object of this invention to provide a radio paging receiver of the type described, which is capable of recovering synchronization between internal clock pulses and a radio signal even when the synchronization is disordered after reception of the preamble signal.

A radio paging receiver to which this invention is applicable is for use in responding to a radio signal carrying a call number signal preceded by a preamble signal to announce reception of the radio signal addressed to the radio paging receiver. The radio signal is demodulated into a sequence of digital signals which carries the preamble signal and the call number signal and which is decoded in response to a sequence of internal clock pulses. The radio paging receiver comprises a clock synchronization circuit which produces the internal clock pulse sequence by carrying out synchronization operation of the internal clock pulse sequence with the digital signal sequence. According to this invention, the radio paging receiver comprises field detection means for detecting electric field intensity in relation to the radio signal to produce a field intensity signal representative of the electric field intensity, synchronization detection means, supplied with the digital signal sequence and the internal clock pulse sequence, for calculating a selected one of phase and frequency differences between the digital signal and the internal clock pulse sequence to produce a difference signal which corresponds to the selected one of the phase and the frequency differences, and synchronization control means, supplied with the field intensity signal and the difference signal and connected to the clock synchronization circuit, for controlling the clock synchronization circuit with reference to the field intensity signal and the difference signal to establish synchronization between the internal clock pulse sequence and the digital signal sequence even when the preamble signal is not received.

DESCRIPTION OF THE PREFERRED EMBODIMENT

Figure 1:
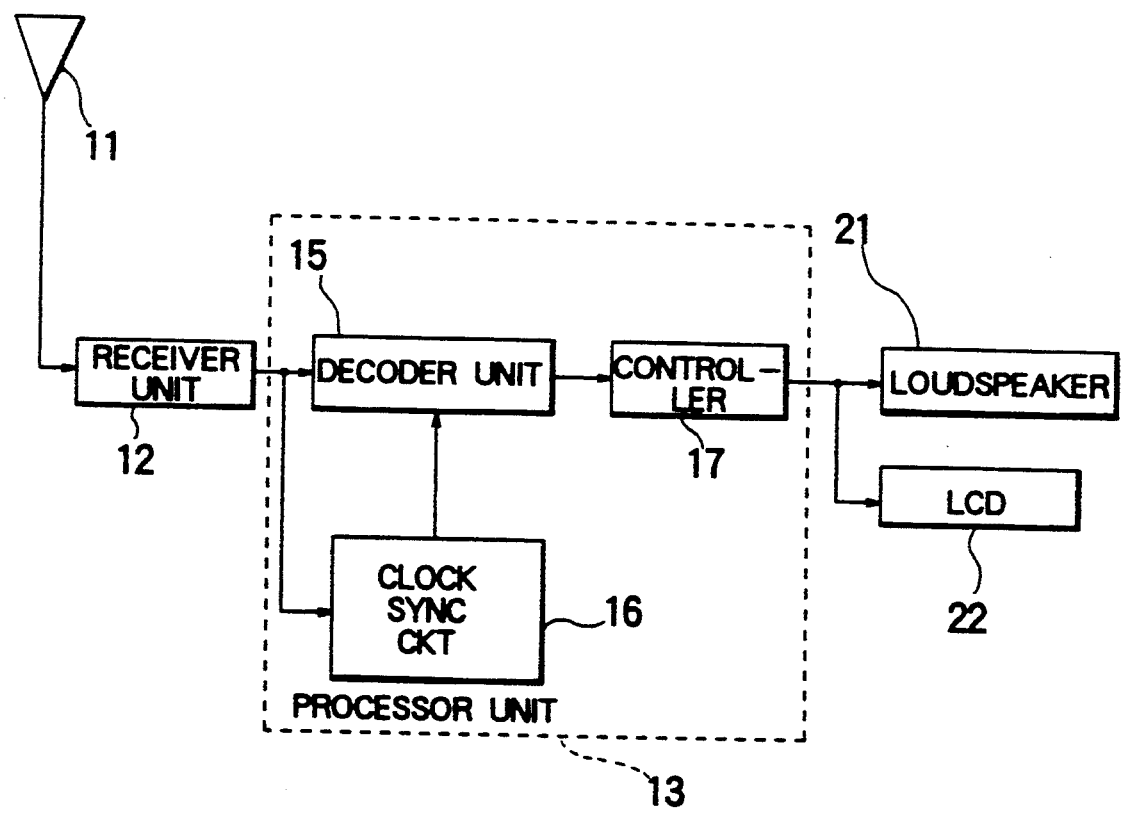
FIG. 1 is a block diagram of a conventional radio paging receiver which has a display unit.

Referring to FIG. 1, description will at first be made about a conventional radio paging receiver for a better understanding of this invention. The conventional radio paging receiver is supplied with a radio signal which is subjected to quadrature modulation by a preamble signal, a call number signal, and a display information signal (or a message signal). The preamble signal is represented by repetitions of a logic "1" level signal and a logic "0" level signal while the call number signal is representative of a call number assigned to a subscriber or a possessor. In addition, the display information signal is representative of display information or a message to be visually displayed by the radio paging receiver.

In FIG. 1, the radio signal is received as a reception signal by an antenna 11 and is thereafter sent to a receiver unit 12 which carries out quadrature demodulation in a known manner to produce a demodulated signal in the form of a sequence of digital signals. The digital signal sequence is delivered to a processor unit 13 which may be implemented by a microprocessor and which comprises a decoder unit 15, a clock synchronization circuit 16, and a controller 17.

The clock synchronization circuit 16 is operable in response to the digital signal sequence to detect the preamble signal and to control synchronization between the digital signal sequence and a sequence of internal clock pulses. The decoder unit 15 establishes synchronization between the digital signal sequence and the internal clock pulse sequence by the use of a result of detection of the preamble signal and thereafter detects whether or not the call number signal is coincident with a preassigned call number signal representative of a preassigned call number of the radio paging receiver.

On detection of coincidence between the call number signal and the preassigned call number signal, the decoder unit 15 energizes the controller 17 to drive a loudspeaker 21. As a result, an audible tone is generated from the loudspeaker 21. On the other hand, the controller 17 is supplied from the decoder unit 15 with the display information signal and delivers the display information signal to a display unit 22 specified by a liquid crystal display (LCD).

As mentioned before, the clock synchronization circuit 16 carries out synchronization control operation in response to the digital signal sequence while the decoder unit 15 establishes the synchronization under control of the clock synchronization circuit 16. Such synchronization is established in the decoder unit 15 by shifting a phase of the internal clock pulses to adjust that of the digital signal sequence.

Herein, the illustrated clock synchronization circuit 16 carries out the synchronization control operation only during reception of the preamble signal. When extinction of the preamble signal is detected by the decoder unit 15, the clock synchronization circuit 16 stops the synchronization control operation in response to an interruption signal sent from the decoder unit 15. Thus, no synchronization control operation is carried out in the clock synchronization circuit 16 after reception of the preamble signal even while the remaining radio signal is received by the receiver unit 12.

The conventional radio paging receiver has shortcomings as pointed out in the preamble of the instant specification.

Figure 2:
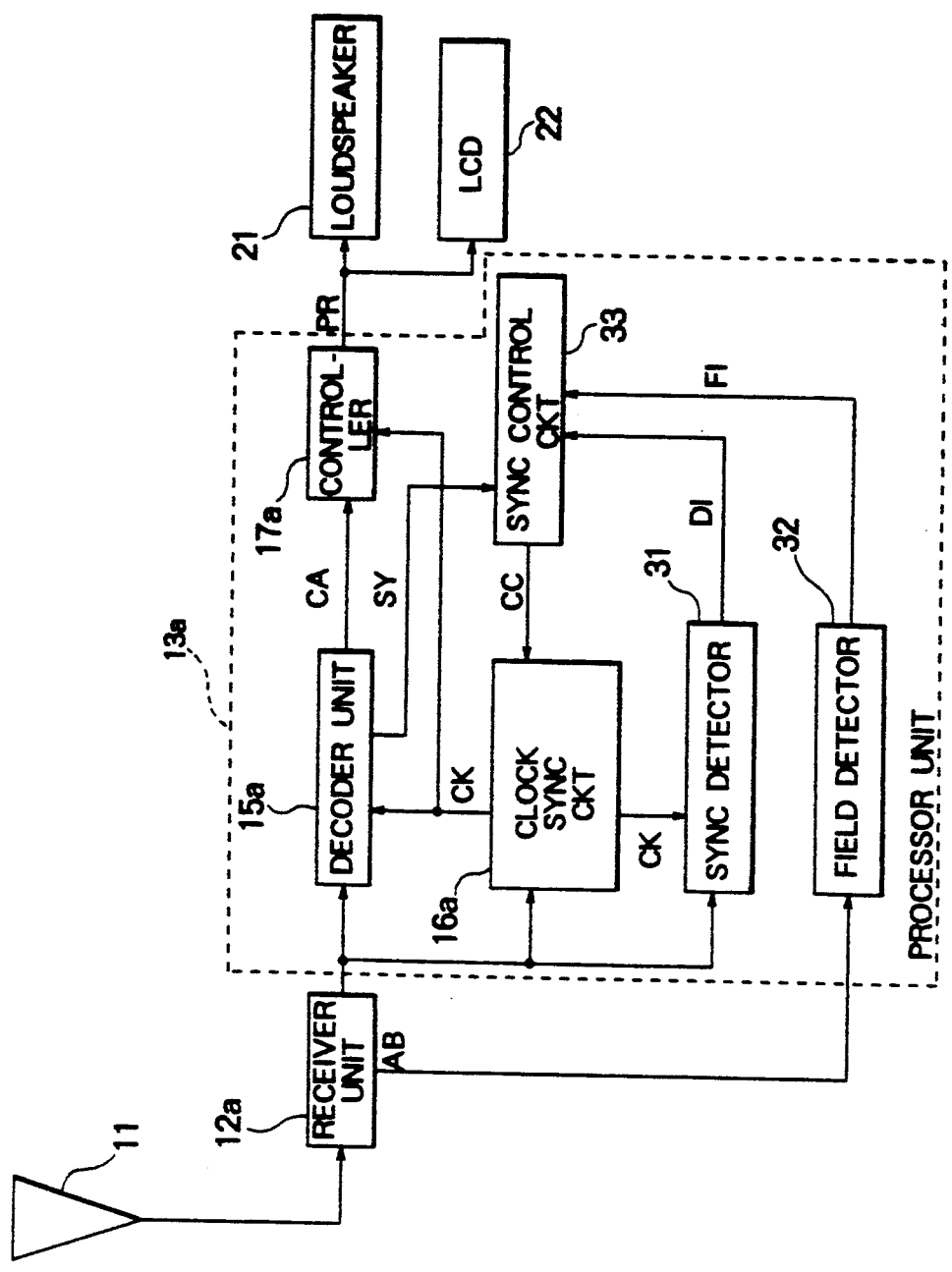
FIG. 2 is a block diagram of a radio paging receiver according to a preferred embodiment of this invention.

Referring to FIG. 2, a radio paging receiver according to a preferred embodiment of this invention comprises an antenna 11, a receiver unit 12a, a processor unit 13a, a loudspeaker 21, and a display unit 22, such as LCD. Like in FIG. 1, the receiver unit 12a is supplied through the antenna 11 with a radio signal which is quadrature modulated by a preamble signal, a call number signal, and a display information signal and which falls within a radio frequency band. Thus, the receiver unit 12a receives the radio signal as a reception signal and demodulates the reception signal into a sequence of digital signals AA by carrying out quadrature demodulation in a known manner. In addition, the receiver unit 12a amplifies the radio signal to produce an amplified signal AB corresponding to the radio signal. Such an amplified signal AB may be derived from a specific stage of amplifiers included in the receiver unit 12a in the well known manner. From this fact, it is readily understood that the receiver unit 12a carries out amplification, demodulation, and waveform shaping of the reception signal in a known manner to obtain the digital signal sequence AA and the amplified signal AB.

In FIG. 2, the processor unit 13a comprises a decoder unit 15a, a clock synchronization circuit 16a, and a controller 17a which are somewhat different from those illustrated in FIG. 1, respectively, as will become clear. Moreover, the processor unit 13a further comprises a synchronization detector 31, a field detector 32, and a synchronization control circuit 33 connected to the decoder unit 15a, the clock synchronization circuit 16a, the synchronization detector 31, and the field detector 32 in the illustrated manner.

The digital signal sequence AA is given to both the decoder unit 15a and the clock synchronization circuit 16a like in FIG. 1 and also to the synchronization detector 31 in parallel, as shown in FIG. 2. As mentioned before, the digital signal sequence AA is composed of the digital signals each of which has a leading edge and a trailing edge.

The illustrated clock synchronization circuit 16a may be formed, for example, by a PLL (Phase Locked Loop) which comprises a voltage controlled oscillator, a phase detector clock, and a loop filter. In this event, the voltage controlled oscillator is operable as a clock generator which controls a phase of internal clock pulses CK in accordance with a phase difference between the digital signals and the internal clock pulses CK. At any rate, each phase of the internal clock pulses CK is controlled with reference to the leading and the trailing edges of each digital signal. As a result, the internal clock pulse sequence CK is phase controlled and is sent from the clock synchronization circuit 16a to the decoder unit 15a, the controller 17a, and the synchronization detector 31.

Supplied with the internal clock pulses CK and the digital signal sequence AA, the decoder unit 15a compares the call number signal included in the digital signal sequence AA with the preassigned call number signal memorized in the decoder unit 15a in synchronism with the internal clock pulses CK. When the call number signal is coincident with the preassigned call number signal, the decoder unit 15a supplies the controller 17a with a calling signal CA which indicates that a call is directed to the radio paging receiver in question. The calling signal CA is followed by the display information signal and is delivered to the controller 17a in synchronism with the internal clock pulse sequence CK. The controller 17a processes the calling signal CA in accordance with the internal clock pulse sequence CK into a processed signal PR followed by the display information signal. The controller 17a delivers the processed signal and the display information signal to the loudspeaker 21 and the display unit 22 to make the loudspeaker 21 generate the audible tone and to make the display unit 22 visually display the display information signal.

Furthermore, the illustrated decoder unit 15a detects the preamble signal and a word synchronization signal which is arranged in a predetermined interval of time in the display information signal to define each word of the display information signal. On detection of the preamble signal and the word synchronization signal, the decoder unit 15a supplies the synchronization control circuit 33 with an operation control signal SY which is effective to control operation of the synchronization control circuit 33 in a manner to be described later in detail.

Such detection of the preamble signal and the word synchronization signal can be readily realized by the use of a known pattern matching technique.

The synchronization control circuit 33 carries out synchronization control during reception of the operation control signal SY in cooperation with the synchronization detector 31 and the field detector 32 in a manner to be described.

The synchronization detector 31 compares the digital signal sequence AA (namely, the digital signals) with the phase-controlled clock pulses CK to detect a frequency or a phase difference between the digital signal sequence AA and the internal clock pulse sequence CK and to produce a difference signal DI representative of the frequency or the phase difference between the digital signal sequence AA and the internal clock pulse sequence CK. The difference signal DI is sent to the synchronization control circuit 33 connected to the field detector 32 also.

On the other hand, the amplified signal AB is related to the radio signal and is sent to the field detector 32. The field detector 32 detects intensity of an electric field from the amplified signal AB to supply the synchronization control circuit 33 with a field intensity signal FI representative of the intensity of the electric field. The field detector 32 has a threshold level and compares the intensity of the electric field with the threshold level to produce, as the field intensity signal FI, the logic "1" level and the logic "0" level when the intensity is stronger than the threshold level and, otherwise, respectively.

The above-mentioned synchronization detector 31 and the field detector 32 may be implemented by known detectors and will therefore not be described any longer.

Further referring to FIG. 2, the synchronization control circuit. 33 is given the field intensity signal FI, the difference signal DI, and the operation control signal SY from the field detector 32, the synchronization detector 31, and the decoder unit 15a, respectively.

Let the field intensity signal FI take the logic "0" level because the field intensity is not stronger than the threshold level. In this case, the synchronization control circuit 33 is operated during presence of both the preamble signal and the word synchronization signal. Specifically, the synchronization control circuit 33 produces a clock synchronization control signal CC in response to the operation control signal SY which is produced during the presence of the preamble signal and the word synchronization signal. Herein, it is assumed that the clock synchronization control signal CC is set in response to the preamble signal and is reset in response to the word synchronization signal. Consequently, the clock synchronization circuit 16a is intermittently operated in response to the clock synchronization control signal CC to compare the internal clock pulses CK with the digital signals AA when the electric field is weak. Stated otherwise, the synchronization control circuit 33 stops the synchronization control operation in the clock synchronization circuit 16a when no operation control signal SY appears and when the electric field is weak.

On the other hand, let the field intensity signal FI take the logic "1" level because the field intensity is stronger than the threshold level. In this event, the synchronization control circuit 33 monitors the difference signal DI to supply the clock synchronization control signal CC to the clock synchronization circuit 16a when the difference signal DI represents the difference which falls outside of a predetermined range. As a result, the clock synchronization circuit 16a starts the synchronization control operation in response to the clock synchronization control signal CC so as to recover synchronization between the internal clock pulses CK and the digital signals AA.

When the difference falls within the predetermined range, the synchronization control circuit 33 interrupts the clock synchronization control signal CC. The resultant clock synchronization circuit 16a stops the synchronization control operation.

Figure 3:
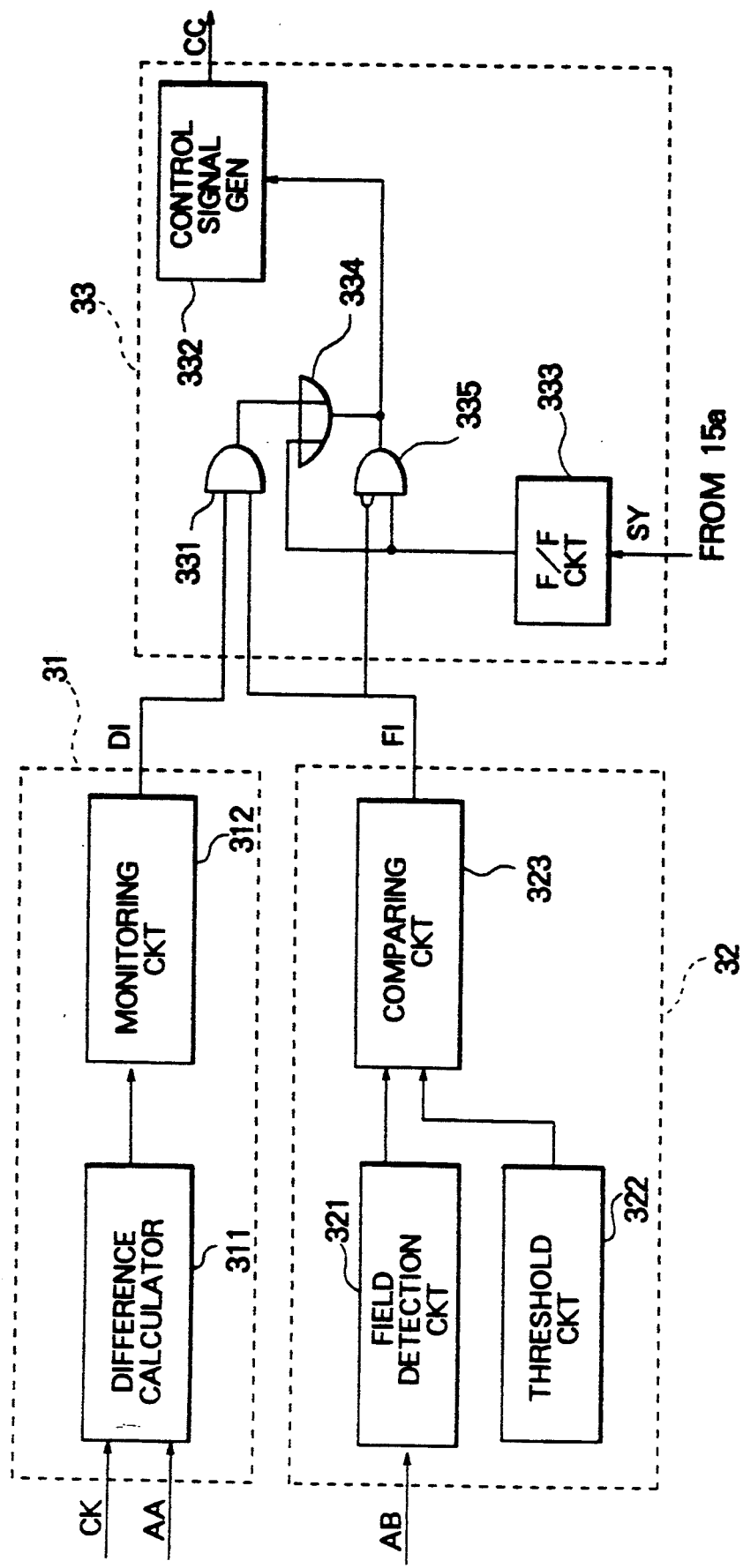
FIG. 3 is a block diagram of a part of the radio paging receiver illustrated in FIG. 2.

Referring to FIG. 3, the synchronization detector 31, the field detector 32, and the synchronization control circuit 33 can execute the above-mentioned operation. In FIG. 3, the synchronization detector 31 comprises a difference calculator 311 supplied with the internal clock pulse sequence CK and the digital signal sequence AA from the clock synchronization circuit 16a and the receiver unit 12a. The difference calculator 311 calculates a phase difference between the internal clock pulse sequence CK and the digital signal sequence AA to produce a calculation result signal representative of the phase difference. Alternatively, a frequency difference may be calculated in the difference calculator 311 instead of the phase difference. Taking this into consideration, such a phase or a frequency difference may be collectively called a deviation.

In the synchronization calculator 31, the calculation result signal is sent to a monitoring circuit 312. The monitoring circuit 312 monitors whether or not the deviation represented by the calculation result signal falls within a predetermined range to produce the difference signal DI of the logic "1" level when the deviation exceeds the predetermined range. Otherwise, the difference signal DI takes the logic "0" level. Anyway, the difference signal DI is sent from the monitoring circuit 312 to the synchronization control circuit 33, as illustrated in FIG. 3.

On the other hand, the field detector 32 comprises a field detection circuit 321 supplied from the receiver unit 12a (FIG. 2) with the amplified signal AB. The field detection circuit 321 measures electric field intensity from the amplified signal AB to produce an intensity signal representative of the electric field intensity. A threshold circuit 322 is included in the field detector 32 to determine a threshold level for operating the clock synchronization circuit 16a and produces a threshold level signal representative of the threshold level.

Both the intensity signal and the threshold level signal are sent to a comparing circuit 323 to be compared with each other. The comparing circuit 323 produces a result of comparison as the field intensity signal FI which takes either the logic "1" level or "0" level. More particularly, the field intensity signal FI takes the logic "1" level and the logic "0" level when the electric field intensity is greater than the threshold level and, otherwise, respectively.

The field intensity signal FI is supplied together with the difference signal DI to the synchronization control circuit 33. In the illustrated example, the synchronization control circuit 33 comprises an AND gate 331 supplied with both the field intensity signal FI and the difference signal DI to produce, as an AND gate output signal, the logic "1" level only when both the field intensity signal FI and the difference signal DI take the logic "1" levels. Otherwise, the AND gate 331 produces the logic "0" level. The AND gate output signal is sent to a control signal generator 332 as an enable signal.

Supplied with the enable signal, the control signal generator 332 supplies the synchronization control signal CC to the clock synchronization circuit 16a.

In the illustrated synchronization control circuit 33, a flip-flop circuit 333 is set on reception of the preamble signal and is reset on extinction of the word synchronization signal. Accordingly, the enable signal is also sent from the flip-flop circuit 333 through an OR gate 334 to the control signal generator 332 in response to the operation control signal SY.

In addition, the field intensity signal FI is inverted and is thereafter sent to an AND gate 335 together with a flip-flop output signal. With this structure, the enable signal is also supplied to the control signal generator 332 even when the field intensity is weaker than the threshold level on detection of the preamble signal by the decoder unit 15a, as mentioned in conjunction with FIG. 2.

Therefore, it is possible to reduce wrong recognition of the radio signal because the clock synchronization can be also established even for a time interval except a reception time interval of the preamble signal.

With this structure, it is possible to operate the clock synchronization circuit 16a again and to modify the difference only when the electric field is stronger than the threshold level and the difference becomes large between the internal clock pulses CK and the digital signals AA.

While this invention has thus far been described in conjunction with a preferred embodiment thereof, it will readily be possible for those skilled in the art to put this invention into practice in various other manners. For example, a whole of the processor unit 13a may be implemented by an information processing device. In this case, all of the operations carried out in the synchronization control circuit 33, the clock synchronization circuit 16a, the synchronization detector 31, and the field detector 32 may be executed by a software program. In addition, the loudspeaker 21 may be replaced by a vibrator or the like.

What is claimed is:

1. A radio paging receiver for receiving a radio signal carrying a call number signal preceded by a preamble signal to announce reception of said radio signal addressed to said radio paging receiver, said radio signal being demodulated into a sequence of digital signals which carries said preamble signal and said call number signal and which is decoded in response to a sequence of internal clock pulses, said radio paging receiving comprising:

a clock synchronization circuit which produces said internal clock pulse sequence by carrying out synchronization operation of said internal clock pulse sequence with said digital signal sequence;

field detection means having a predetermined threshold level, for detecting an electric field intensity level in relation to said radio signal to produce a field intensity signal representative of whether said electric field intensity level is weaker than said predetermined threshold level;

synchronization detection means, supplied with said digital signal sequence and said internal clock pulse sequence, for calculating a selected one of phase and frequency differences between said digital signal sequence and said internal clock pulse sequence to produce a difference signal which corresponds to said selected one of the phase and the frequency differences; and synchronization control means, supplied with said field intensity signal and said difference signal and connected to said clock synchronization circuit, for controlling said clock synchronization circuit with reference to said field intensity signal and said difference signal to establish synchronization between said internal clock pulse sequence and said digital signal sequence even when said preamble signal is not received and to maintain reception even when said electric field intensity level is weaker than said predetermined threshold level on detection of the preamble signal.

2. A radio paging receiver as claimed in claim 1, wherein said field detection means comprises:

means for detecting said electric field intensity to produce an intensity signal representative of said electric field intensity level;

intensity threshold means for producing a threshold level signal representative of said predetermined threshold level; and comparing means for comparing said intensity signal with said threshold level signal to produce said field intensity signal.

3. A radio paging receiver as claimed in claim 2, wherein said synchronization detection means comprises:

difference calculation means, supplied with said internal clock pulse sequence and said digital signal sequence, for calculating said selected one of the phase and the frequency differences between said internal clock pulse sequence and said digital signal sequence to produce a calculation result signal representative of said selected one of the phase and the frequency differences; and monitoring means, supplied with said calculation result signal, for monitoring whether or not said calculation result signal falls within a predetermined range to produce said difference signal when said selected one of the phase and the frequency differences exceeds said predetermined range.

4. A radio paging receiver as claimed in claim 3, wherein said synchronization control means comprises:

a logic circuit connected to said field detection means and said synchronization detection means for producing an enable signal when said field intensity signal is higher than said threshold level signal and when said selected one of the phase and the frequency differences exceeds said predetermined range; and control signal generating means, supplied with said enable signal, for supplying said clock synchronization circuit with a synchronization control signal which energizes said clock synchronization circuit to establish the synchronization between said internal clock pulse sequence and said digital signal sequence.

* * * * *